(12) United States Patent  
Ferlitsch

(10) Patent No.: US 7,251,052 B2
(45) Date of Patent: Jul. 31, 2007

(54) METHOD AND APPARATUS FOR SELECTING JOB CONTROL DEVICE PROFILES

(75) Inventor: Andrew Rodney Ferlitsch, Tigard, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 549 days.

(21) Appl. No.: 10/869,792

(22) Filed: Jun. 15, 2004

(65) Prior Publication Data
US 2005/0275678 A1 Dec. 15, 2005

(51) Int. Cl.
G06K 15/00 (2006.01)
G06K 9/34 (2006.01)
(52) U.S. Cl. ............... 358/1.6; 358/1.18; 715/911; 382/180
(58) Field of Classification Search .......... 382/180; 358/1.6, 1.13, 1.1, 1.9, 1.18; 715/911
See application file for complete search history.

(56) References Cited

U.S. PATENT DOCUMENTS

| 5,467,432 | A | 11/1995 | Ota | 395/112 |
|---|---|---|---|---|
| 5,511,149 | A | 4/1996 | Hayano | 395/112 |
| 5,754,748 | A | 5/1998 | Rivers et al. | 395/116 |
| 5,960,113 | A | 9/1999 | Even et al. | 382/229 |
| 6,027,268 | A | 2/2000 | Bischel et al. | 400/584 |
| 2003/0046454 | A1 | 3/2003 | Hoffmann et al. | 710/8 |
| 2003/0184782 | A1 | 10/2003 | Perkins et al. | 358/1.13 |
| 2003/0231328 | A1* | 12/2003 | Chapin et al. | 358/1.13 |
| 2004/0190014 | A1* | 9/2004 | Ferlitsch | 358/1.5 |
| 2004/0252344 | A1* | 12/2004 | Foster et al. | 358/2.1 |
| 2005/0146742 | A1* | 7/2005 | Gregory | 358/1.15 |
| 2005/0162667 | A1* | 7/2005 | Felix et al. | 358/1.1 |
| 2005/0225789 | A1* | 10/2005 | Ferlitsch | 358/1.13 |

FOREIGN PATENT DOCUMENTS

EP 1006431 A1 * 6/2000
WO WO 99/38068 * 7/1999

* cited by examiner

Primary Examiner—Jerome Grant, II
(74) Attorney, Agent, or Firm—Marger Johnson & McCollom PC

(57) ABSTRACT

A printing device contains a first native print job control profile and one or more non-native print job control profiles. The printing device receives a print job containing print job commands and compares the print job commands with the first native job control profile. If all the print job commands correspond with command structures in the first job control profile, then the printing device uses the first native job control profile for interpreting print job commands. If the print job commands do not correspond with the command structures in the first native job control profile, then the printing device uses one of the second non-native control profile for interpreting the print job commands.

16 Claims, 4 Drawing Sheets

(BACKGROUND)

(BACKGROUND)

METHOD AND APPARATUS FOR SELECTING JOB CONTROL DEVICE PROFILES

BACKGROUND

FIG. 1A shows how a document or image is printed according to a desired set of print requirements, such as number of copies, collation, paper selection, finishing, etc. A client 12 in one example may be a Personal Computer (PC). The client 12 is connected to a printing device 14. In order for the printing device 14 to correctly print a print job 16, a user must select options from a print requirement generation process in the client 12, such as a printer driver, that is compatible with the printing device 14. Alternatively, the default settings of the printing device 14 must be set to the print requirements for the print job 16.

A print requirement may be chosen for the print job 16 that is not compatible with the printing device 14 (e.g., mismatched printer drivers). For example, the print job 16 may include print requirements for a model A printer but the print job may be sent to a model B printer. In this situation the model B printer may generate undesirable results for the print job 16. To solve the problem the firmware in the model B printer would have to be replaced with model A printer firmware 18.

FIG. 1B shows an approach where the numbering for input tray print requirements is not hard-coded into the printing device 14. Instead, the printing device 14 has loadable input tray mapping tables. The mapping tables include a mapping table 20 for the native printing device model B and a mapping table 22 for a model A printing device. The printing device 14 can then be manually set to emulate the input tray numbering for the printing devices associated with mapping tables 20 or 22.

This method has several limitations. For example, the printer only handles remapping of input trays, more specifically, where input trays are specified by a number (e.g., PCL). The printer must also have a mapping for the replacement device and must know to use the replacement device mapping prior to receiving the print job.

Many standard organizations and manufacturers have been moving towards more uniform and compatible print job control language specifications with devices from other manufacturers, such as compatibility with Hewlett Packard's device implementations of the Printer Job Language (PJL).

One method to obtain such compatibility is for a manufacturer to replace their previous job control implementation with the more uniform cross-manufacturer implementation. But, the printer manufacturer would then lose backward compatibility with its own previous printer implementation.

Therefore, there is a need for providing compatibility with a more uniform cross-manufacturer implementation of a job control language, while maintaining backwards compatibility with previous implementations. Further, there is a need to automatically detect whether the print data stream conforms to the uniform cross-manufacturer or the manufacturer's own implementation without having to manually switch between printer implementations.

SUMMARY OF THE INVENTION

A printing device contains a first native print job control profile and one or more non-native print job control profiles. The printing device receives a print job containing print job commands and compares the print job commands with the first native job control profile. If all the print job commands correspond with command structures in the first job control profile, then the printing device uses the first native job control profile for interpreting print job commands. If the print job commands do not correspond with the command structures in the first native job control profile, then the printing device uses one of the second non-native control profile for interpreting the print job commands.

The foregoing and other objects, features and advantages of the invention will become more readily apparent from the following detailed description of a preferred embodiment of the invention which proceeds with reference to the accompanying drawings.

DETAILED DESCRIPTION

Printing device compatibility is provided with a more uniform cross-manufacturer implementation of a Job Control Language (JCL) while maintaining backwards compatibility with the printing device native implementation. Switching is automatically provided between different JCLs without a user having to manually switch between different JCL implementations.

The recognition and interpretation of the job control language, such as PJL, is not hard-coded into the printing device. Instead, the command recognition and interpretation is provided through a lookup mechanism that shares a common language parser. The printing device contains at least two Job Control Device Profiles (JCDP). One profile is for the printing device native implementation and the second profile is for a uniform cross-manufacturer implementation. Each JCDP contains command/operand structures and the associated environment variable settings (i.e., action) for different printer models.

Figure 1A:
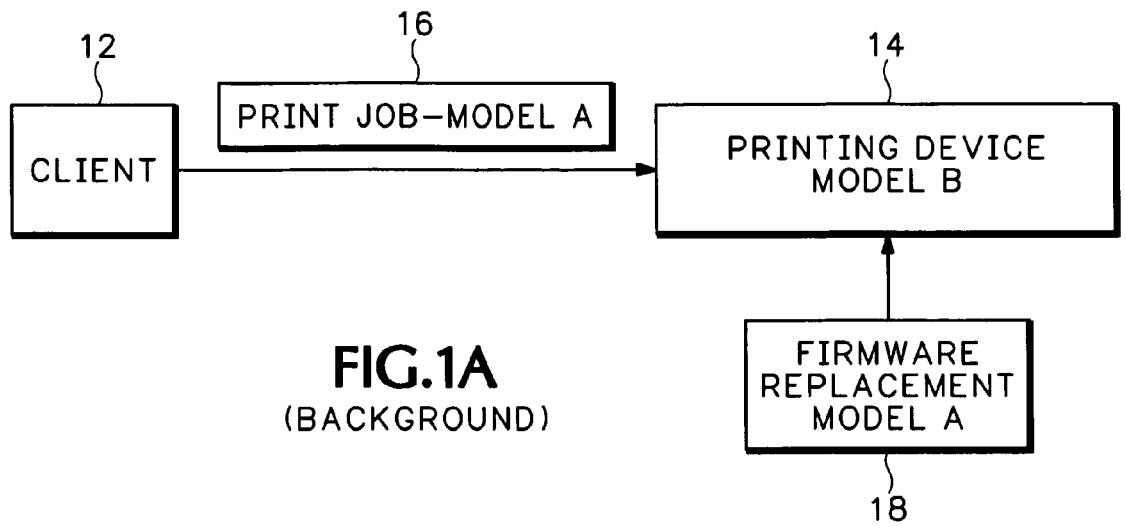
FIGS. 1A and 1B show techniques for changing the configuration of a printing device.
Figure 1B:
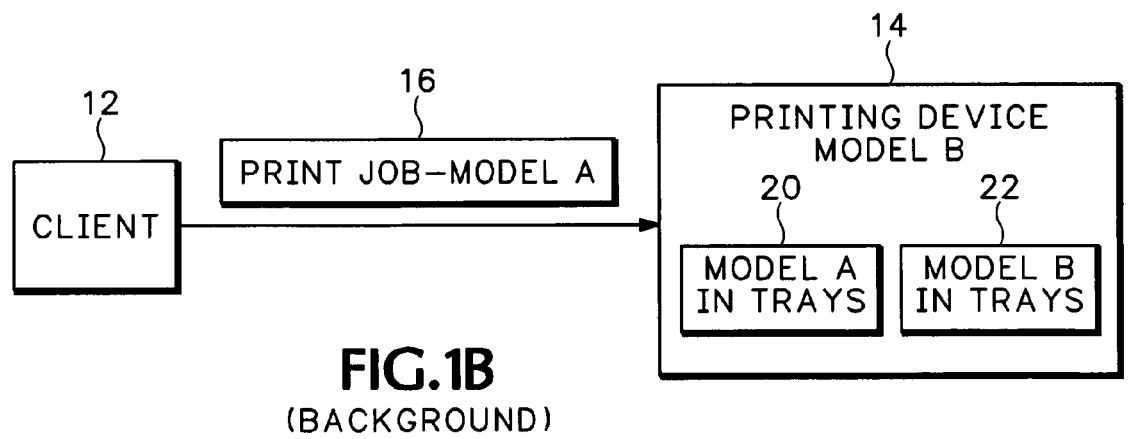
Figure 2:
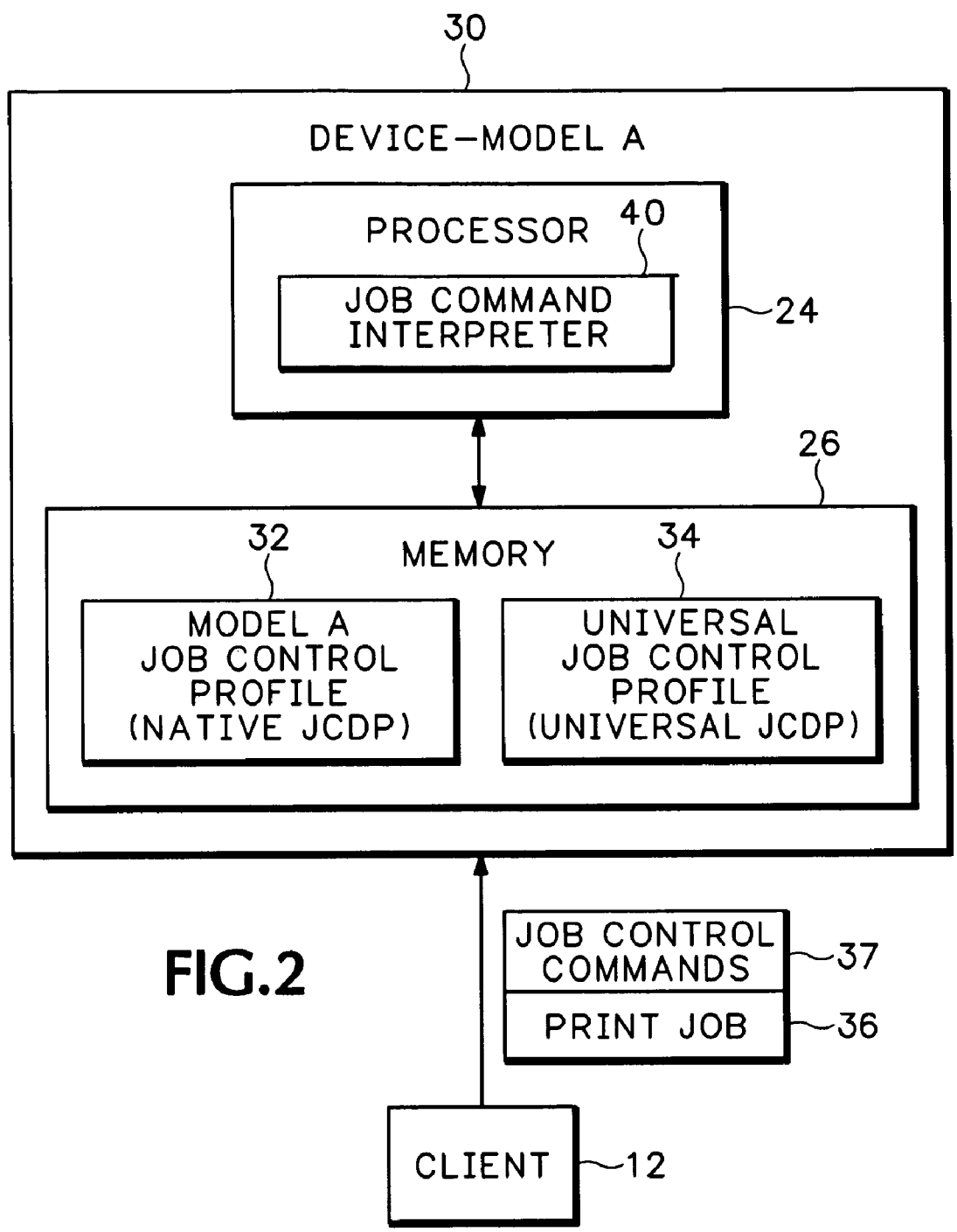
FIG. 2 is a system for automatically detecting and reconfiguring job control profiles in a printing device.

Referring to FIG. 2, a printing device 30 includes a processor 24 and a memory 26. The printing device 30 receives print jobs 36 from a client device 12, such as a Personal Computer (PC). Some print jobs 36 received by the printing device 30 may include print commands that correspond with the native model A printing device 30. Other print jobs 36 may include print commands that correspond to other printing device models. A print job command interpreter 40 operated in the processor 24, such as a PJL interpreter, makes two passes over the job control commands 37 in the print job 36.

During a first pass, the job control commands 37 are parsed, copied to a job control temporary storage and looked up in a native JCDP 32. For each command lookup, the interpreter 40 records whether the command was recognized or not recognized. No interpretation is made of the job control commands 37 during the first pass.

Once all of the job control commands 37 are parsed, a second pass is made through the job control commands 37 stored in the temporary storage. Prior to parsing the commands in the second pass, a determination is made which JCDP profile 32 or 34 will be used. If all the commands were recognized on the first pass using the native JCDP 32, then the native JCDP 32 is used in the second pass. If at least one command was not recognized, then the uniform cross-manufacturer JCDP 34 is used in the second pass. During the second pass, the commands are interpreted according to the selected JCDP profile 32 or 34.

In other variations, there can be more than one uniform JCDP 34, such as one per select manufacturer (e.g., HP, Xerox and Ricoh). If a command is not recognized in the first pass, the above process is repeated in subsequent passes, eliminating manufacturer specific JCDPs, until one JCDP recognizes all the job control commands 37 in the print job 36. Other judicious methods can be used for recognition, such as recognizing unique manufacturer specific driver signatures, for example, such as in a PJL comment.

A technique is described in more detail below for defining/storing job control device profiles (JCDP) in a printing device. Next a technique is described for implementing the first pass to determine which JCDP profile to use. Then it is described how the job control commands are processed on the second pass for the selected JCD profile.

Defining/Storing JCD Profiles on a Device

Referring still to FIG. 2, at least two JCD profiles (JCDPs) 32 and 34 are loaded on the printing device 30. One JCDP 32 is for the device's native job control language (e.g., PJL) recognition/interpretation. A native JCDP would include the control language information associated with a particular printing device model of the printing device 30. The remaining JCD profile(s) (JCDP) 34 are for one or more uniform cross-manufacturer or manufacturer specific job control language (e.g., PJL) recognition/interpretations different from the model of the printing device 30.

In one example, a PJL language may be used both for the profile 32 and 34. However, the two PJL languages may be implemented differently for the printing device model A and for other printer model types. The JCDP 34 could be used for manufacturer specific compatibility (e.g., HP, Xerox, Ricoh). In other implementations, a page description language (PDL), such as Printer Control Language (PCL), Portable Document Format (PDF), Postscript (PS), etc. may be used for one or both of the profiles 32 and 34. Of course, other types of languages could also be used.

JCDPs 32 and 34 contain lists and syntactical recognition for all valid commands and associated operands and sub-operands for the native printer 30 and the universal printer models, respectively. For example, in PJL, valid commands in one of the JCDP 32 or 34 might include the following:
SET
DEFAULT
ENTER Operands to the SET and DEFAULT commands might include:
DUPLEX
BOOKLET
INTRAY
OUTTRAY Sub-operands for the DUPLEX command might include:
SIMPLEX
BOOK
TABLET For each combination of command/operand/sub-operand, the associated action (e.g., environment variable setting) is specified. For example, in the case of duplex, one of the JCDPs 32 or 34 might contain:

```
CMD: SET
OPND:       DUPLEX
SUBOPND:    SIMPLEX
            {
               set environ $duplex = off
            }
SUBOPND:    BOOK
            {
               set environ $duplex = on
               set environ $binding = longedge
            }
SUBOPND:    TABLET
            {
               set environ $duplex = on
               set environ $binding = shortedge
            }
```

The job command interpreter 40 compares the command/operand/sub-operand structures, such as the example command structures shown above, with the job control commands 37 in the print job 36.

Job Command Interpreter—First Pass

Figure 3:
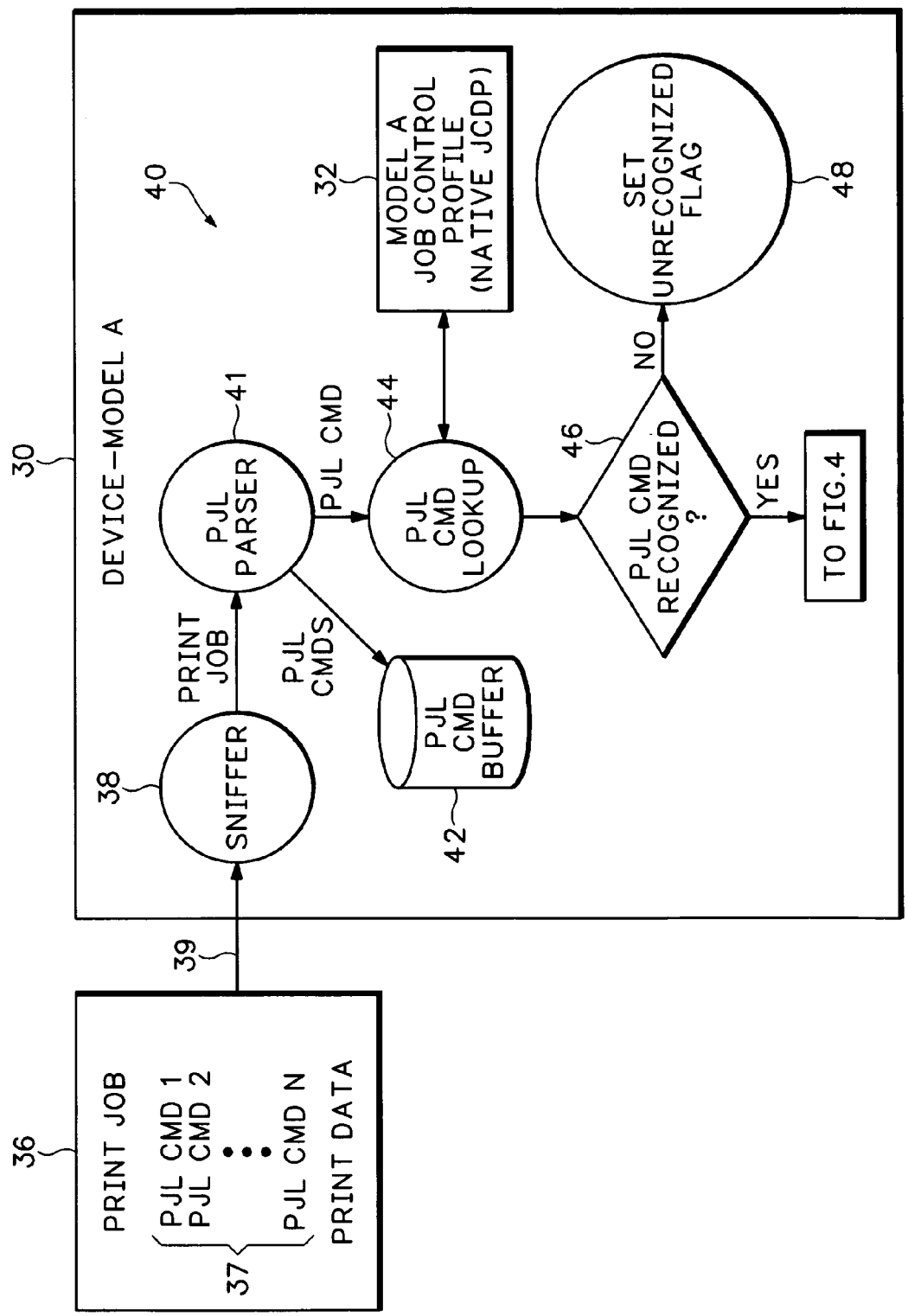
FIG. 3 is a diagram showing how a job command interpreter analyzes a print job during a first pass to select a job control profile.

FIG. 3 shows a first pass operation conducted by the job command interpreter 40. A sniffer process 38 conducts a pre-read of the job control commands 37 in the print job 36 to determine the command language. For example, if the sniffer 38 determines the print job 36 uses PJL commands, the print job 36 is sent to a PJL parser 41. During the first pass, the job control commands 37 are not interpreted and no printer actions are taken. The parser 41 parses each command, operand and any sub-operands 37 in the print job 36.

For each PJL command 37, the job command interpreter 40 performs the following operations. The interpreter 40 conducts a command lookup 44 for the command/operand/sub-operand sequence in the native JCDP 32. If any command sequence is not found or recognized in the native JCDP 32 in operation 46, a flag is set in operation 48. For example, an identified SET command may not have any of the sequences identified above.

In one embodiment, each parsed command sequence is stored in a temporary PJL command buffer 42. The above process continues until the last job control command 37 is parsed. In an alternate embodiment, the first pass of the job command interpreter 40 is terminated if any job control command sequence is unrecognized in operation 46.

Job Control Command Interpreter—Second Pass

Figure 4:
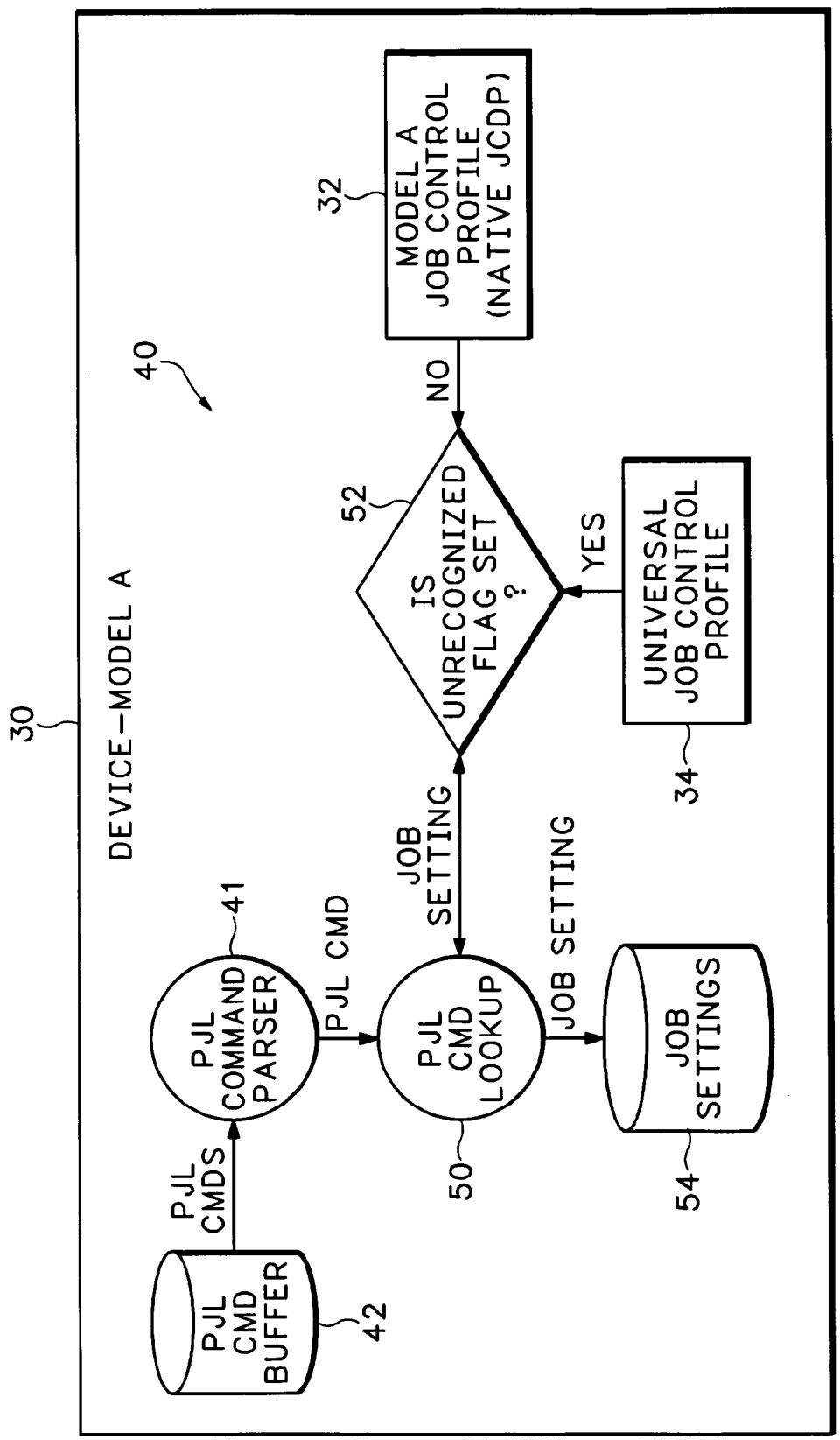
FIG. 4 is a diagram showing how the job command interpreter analyzes the print job during a second pass using the selected job control profile.

FIG. 4 shows how the job command interpreter 40 performs a second pass. During the first pass, the interpreter 40 determined if any command sequences in the print job 36 were unrecognized. In one example, an unrecognized PJL command or command structure is indicated by the processor 24 in FIG. 2 setting the unrecognized flag in operation 48 of FIG. 3.

If all command sequences were indicated as recognized in block 52, the interpreter 40 uses the native JCDP 32 to parse and interpret the job control commands stored in the job command buffer 42. If one or more command sequences are indicated as unrecognized in block 52, then the universal JCDP 34 is used to parse and interpret the job control commands 37 stored in the job command buffer 42.

The interpreter 40 in operation 50 compares commands from buffer 42 with the command or command/operand/sub-operand sequences for the selected JCDP 32 or 34. The interpreter 40 then takes the appropriate action indicated by the matching entry in the dynamically selected JCDP 32 or 34. For example, the job command interpreter 40 may select the universal JCDP 34. A command sequence in the print job may correspond to the following command sequence in the JCDP 34.

|               |                          |
| ------------- | ------------------------ |
| CMD:   SET    |                          |
| OPND:         | DUPLEX                   |
| SUBOPND:      | BOOK                     |
|               | {                        |
|               | set environ $duplex = on |
|               | set environ $binding = longedge |
|               | }                        |

In this example, the job command interpreter 40 sets the job settings 54 in the printing device 30 to enable a duplex mode and bind the pages of the print job along the long edge of the paper.

Job settings 54 typically comprise the actions, operations etc. that the printing device 30 performs on the print data. For example, the job settings or print actions may include duplex, trim, cut and fold operations, to name a few. Of course any other type of printer action can be included in the job settings 54.

In an alternate embodiment, the printing device 30 rewinds the input data stream 39 for the print job 36 (FIG. 3). In this embodiment, the parsed job control commands 37 are not stored in buffer 42 during the first pass, but rather the interpreter 40 rereads the job control commands 37 by rewinding the input stream 39 for the print job 36. In another embodiment, the commands are read from both storage buffer 42 and the remainder (unread) portion of the job control commands 37 are read from the input stream 39 (FIG. 3).

The format and interpretation of the printer's job control language and the necessary command/operand/sub-operand structure can be determined by referring to the command language associated with the particular printing device. For example, HP PCL/PJL Reference, Printer Job Language Technical Reference, 11$^{th}$ Edition (1999), Chapter 6—Environment Commands which is herein incorporated by reference. One example, of a sniffer function is described in: OAK Integrated Printing System (IPS) 5.02 which is herein incorporated by reference.

Other Embodiments

Other embodiments include job control command languages for other imaging operations such as fax, scan, copy and document management, such as document archive/retrieval, manipulation and transfer. Other embodiments include imaging data command languages, such as PCL, Postscript and PDF. Other embodiments include more than one non-native JCDP, such as one per manufacturer specific uniform JCDP.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for configuring a printing device, comprising:
   receiving a print job containing print job commands;
   determining whether the print job commands correspond with a first job control profile associated with a first type of printing device or a second job control profile associated with a second type of printing device;
   using the first print job control profile to identify print job actions for the printing device when the print job commands correspond with the first job control profile and using the second print job control profile associated with the second type of printing device to identify job actions for the printing device when the print job commands do not correspond with the first job control profile
   using a same computing device to parse and interpret all of the print job commands in the print job according to the selected first or second job control profile; and
   setting actions and operations in the same printing device for printing the print job according to the print job commands interpreted using the selected first or second job control profile.

2. The method according to claim 1 wherein the first and second job control profiles include structures for commands and operands and the processor compares the structures with the print job commands to determine which of the first and second job control profiles to use with the print job.

3. The method according to claim 1 including using a same print job language parser for interpreting the print job commands with both the first and second job control profiles.

4. A method for configuring a printing device, comprising:
   receiving a print job containing print job commands;
   determining whether the print job commands correspond with a first job control profile associated with a first type of printing device;
   using the first print job control profile to identify print job actions for the printing device when the print job commands correspond with the first job control profile and using a second print job control profile associated with a second type of printing device to identify job actions for the printing device when the print job commands do not correspond with the first job control profile; and
   conducting a first pass of the print job that compares the print job commands with command structures in the first job control profile without interpreting the print job commands.

5. The method according to claim 4 including automatically selecting the second job control profile when the command structures in the first job control profile no not correspond with the print job commands.

6. The method according to claim 4 including conducting a second pass of the print job that interprets the print job commands according to the selected first or second job control profile and initiates print job actions according to the interpretation.

7. The method according to claim 6 including storing all of the print job commands from the first pass in a buffer and then interpreting the buffered commands using the selected first or second job control profile during the second pass.

8. The method according to claim 4 including discontinuing the first pass whenever the print job commands do not correspond with any of the command structures in the first job control profile and reparsing the print job commands using the second job control file.

9. A method for configuring a printing device, comprising:
receiving a print job containing print job commands;
determining whether the print job commands correspond with a first job control profile associated with a first type of printing device; and
using the first print job control profile to identify print job actions for the printing device when the print job commands correspond with the first job control profile and using a second print job control profile associated with a second type of printing device to identify job actions for the printing device when the print job commands do not correspond with the first job control profile;
using print job command structures in the first job control profile native to a printing device model used for printing the print job; and
using universal print job command structures in the second job control profile that are associated with one or more printing device models that are different than the printing device model used for printing the print job.

10. A printing device, comprising:
a memory storing both a first native job control profile and a second non-native job control profile; and
a same processor automatically switching between the first native job control profile and the second non-native job control profile for interpreting and parsing structures for the print commands and operands in received print jobs according to which of the first and second job control profiles correspond to the print commands and operands.

11. The printing device according to claim 10 wherein the processor operates a job command interpreter that conducts a first scan of the received print jobs to select which one of the first and second job control profiles to use for interpreting the print job commands and generates print actions and operations for the same printing device for printing the print jobs interpreted using the selected first or second job control profiles.

12. The printing device according to claim 10 wherein the first and second job control profiles contain Printer Job Language (PJL) or Page Description Language (PDL) command structures.

13. A printing device, comprising:
a memory storing both a first native job control profile and a second non-native job control profile; and
a processor automatically switching between the first native job control profile and the second non-native job control profile for interpreting print commands in received print jobs according to which of the first and second job control profiles correspond to the print commands;
wherein the processor operates a job command interpreter that conducts a first scan of the received print jobs to determine which one of the first and second job control profiles to use for interpreting the print job commands and conducts a second scan to interpret the print job commands using the selected first or second job control profile.

14. The printing device according to claim 13 including a buffer storing some or all of the print job commands during the first scan and the processor then parsing the buffered commands during the second scan.

15. A printing device, comprising:
a memory storing both a first native job control profile and a second non-native job control profile; and
a processor automatically switching between the first native job control profile and the second non-native job control profile for commands in received print jobs according to which of the first and second job control profiles correspond to the print commands, wherein the first and second job control profiles include structures for commands, operands, and suboperands and the processor compares the structures with the print job commands to determine which of the first and second job control profiles to use with the print job.

16. A printing device, comprising:
a memory storing both a first native job control profile and a second non-native job control profile; and
a processor automatically switching between the first native job control profile and the second non-native job control profile for interpreting print commands in received print jobs according to which of the first and second job control profiles correspond to the print commands, wherein the first job control profile includes command structures native to a printer model for the printing device printing the print jobs and the second job control profile includes command structures universal to multiple other printer models not native to the printing device printing the print jobs.

* * * * *

UNITED STATES PATENT AND TRADEMARK OFFICE
CERTIFICATE OF CORRECTION

| | | |
|---|---|---|
| PATENT NO. | : 7,251,052 B2 | Page 1 of 1 |
| APPLICATION NO. | : 10/869792 | |
| DATED | : July 31, 2007 | |
| INVENTOR(S) | : Andrew R. Ferlitsch | |

It is certified that error appears in the above-identified patent and that said Letters Patent is hereby corrected as shown below:

At column 6, line 64 claim 5, please delete "no" and insert -- do --.

At column 8, line 30 claim 15, please delete "for commands" and insert -- for interpreting print commands --.

Signed and Sealed this

First Day of June, 2010

David J. Kappos
*Director of the United States Patent and Trademark Office*